United States Patent [19]

Menier

[11] 4,274,559
[45] Jun. 23, 1981

[54] PUMP FOR PUMPING VISCOUS MIXTURES

[76] Inventor: Camille Menier, 68 Larivière St., St. Constant, Quebec, Canada, J0L 1X0

[21] Appl. No.: 43,660

[22] Filed: May 30, 1979

[30] Foreign Application Priority Data

May 30, 1978 [GB] United Kingdom ............... 23857/78

[51] Int. Cl.³ .......................... B67D 5/46; G01F 11/02
[52] U.S. Cl. .................................... 222/217; 222/381; 417/469; 417/900
[58] Field of Search ....................... 417/469, 509, 900; 222/217, 381

[56] References Cited

U.S. PATENT DOCUMENTS

| 2,807,025 | 9/1957 | King ............................... 222/381 X |
| 2,840,001 | 6/1958 | Meader ........................... 417/469 X |
| 2,854,170 | 9/1958 | Borgordt et al. ................ 222/381 X |
| 3,266,433 | 8/1966 | Mason ................................... 222/217 |
| 4,036,564 | 7/1977 | Richards ......................... 417/900 X |

FOREIGN PATENT DOCUMENTS 149789  8/1951  Australia .................................. 417/469

Primary Examiner—David A. Scherbel

[57] ABSTRACT

A pump for pumping viscous mixtures is disclosed. The pump comprises a cylindrical casing having a discharge outlet and a feeding opening at its top and side, for a hopper into which is charged viscous mixtures, a cylindrical tube slidably mounted in the casing for movement toward the discharge outlet for trapping a certain quantity of viscous mixture, and a piston slidably mounted in the tube for discharging such quantity of viscous mixture through the discharge outlet of the casing. The hopper is wider than the casing and tube for ease of filling the tube. The tube is advanced across the feeding opening by an advancing force which is exerted on the tube at a point above its longitudinal axis.

4 Claims, 4 Drawing Figures

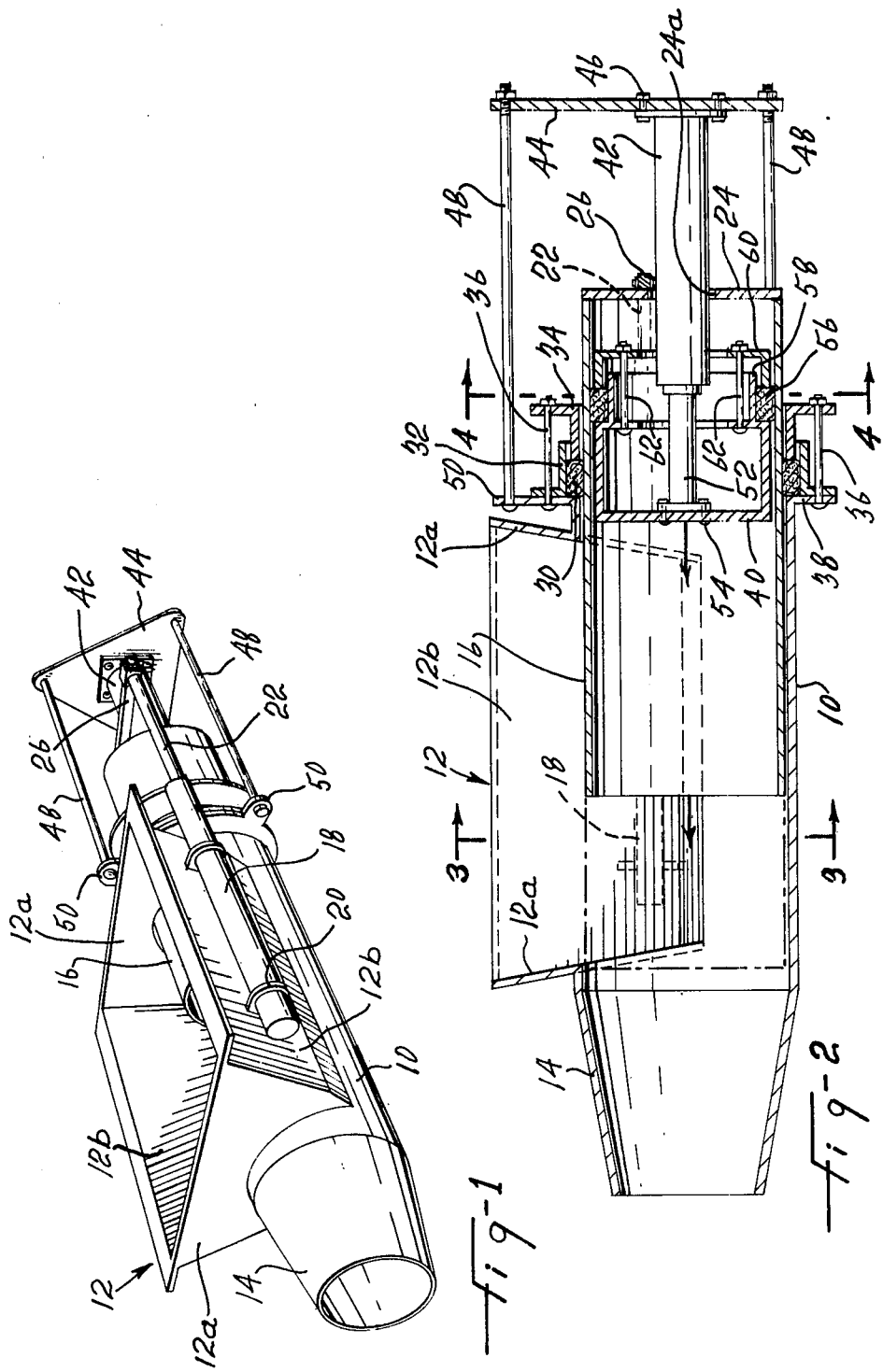

PUMP FOR PUMPING VISCOUS MIXTURES

This invention relates to a pump for pumping viscous mixtures, such as manures, muds, sanitary sewage, concrete, heavy oils, etc.

It is the object of the present invention to provide a pump which can pump solid—liquid viscous mixtures wherein the solid concentration can vary from a small percentage to nearly 100%. Pumps of that type have numerous applications but, more particularly, for pumping manures which, as commonly known, are now moved up to a pile outside the barn by means of a conveyor. The improved pump, in accordance with the invention, permits to pump manure through a pipe to a disposal area outside the barn, thus eliminating the installation and maintenance of an expensive conveyor.

The pump in accordance with the invention comprises a horizontally-disposed cylindrical casing having a discharge outlet at one end and a feeding opening intermediate its ends which opens at the top and sides of said casing, a hopper disposed over and fully communicating with said opening, said hopper having end walls and side walls joining with the edges of said opening, said side walls diverging upwardly from a level below the longitudinal axis of said casing, a tube slidably mounted in the casing for movement towards the discharge outlet for trapping a certain quantity of viscous mixture within the hopper and casing, a piston slidably mounted in the tube for discharging such quantity of viscous mixture through the discharge outlet of the casing, and power means for advancing said tube and exerting an advancing force on said tube above the longitudinal axis of the latter.

A sealing gasket is located between the casing and the sliding tube and between the sliding tube and the piston for sealing the various components of the pump.

The sliding tube and the piston are preferably operated by hydraulic cylinders.

The invention will now be disclosed, by way of example, with reference to the accompanying drawings, in which:

FIG. 1 illustrates a perspective view of a pump in accordance with the invention;

FIG. 2 illustrates a longitudinal section view through the pump of FIG. 1;

Figure 4:
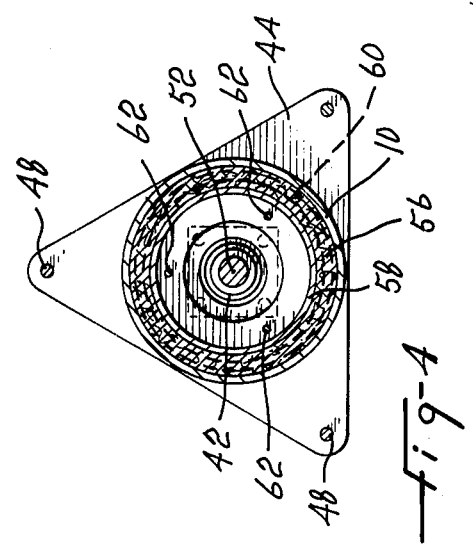
FIG. 4 illustrates a view taken along line 4—4 of FIG. 2.

Referring to the drawings, there is shown a pump comprising a horizontally disposed cylindrical casing 10 provided intermediate its ends with an elongated feeding opening into which is inserted a hopper 12 for receiving a viscous mixture, such as manure. The feeding opening is made in the top end sides of the casing 10. The hopper 12 is disposed over and fully communicates at its lower end with said feeding opening. The hopper 12 has end walls 12a and side walls 12b which join at their lower end with the edges of the feeding opening. The side walls 12b diverge upwardly from a level below the longitudinal axis of casing 10. The casing is provided at one end with a discharge outlet 14 preferably of frusto-conical shape. A cylindrical tube 16, longer than the feeding opening is slidably mounted within the casing by means of horizontally disposed hydraulic cylinders 18 secured one to each side wall 12b of the hopper by means of brackets 20, and having their piston rods 22 connected to the rear plate 24 of the tube through cross-bar 26. Cross-bar 26 extends horizontally at a higher level than the longitudinal axis of tube 16. A sealing gasket 30 is provided between the end of the casing and the tube 16. The gasket 30 is mounted on tube 16 and held in position by means of concentric flange sleeves 32 and 34 secured, by means of bolts 36, to a flange 38 located at the end of the casing opposite to the discharge outlet 14.

A piston 40 is slidably mounted within the tube 16 and operated by a hydraulic cylinder 42 which freely extends through an opening 24a in rear plate 24 and is secured to a triangular plate 44 by means of bolts 46. Each corner of the plate 44 is secured, by means of rods 48, to lugs 50 formed in flange 38 of the casing. The piston rod 52 of the cylinder 42 is secured to the front of piston 40 by means of bolts 54. Cylinder 42 and its piston rod 52 are co-axial with piston 40 and tube 16. A gasket 56 is provided between the tube 16 and the piston. Gasket 56 is sealed on a sleeve 58 of smaller diameter than the piston 40 and which extends from the back of the piston. The gasket is held in position against the shoulder formed by the sleeve by a flanged sleeve 60 engaging the opposite side of the gasket and tightened by means of bolts 62.

The feeding opening in the casing 10 preferably extends as close as possible to the discharge end of the casing and its size depends on the viscosity of the material to be pumped. The tube 16 normally extends slightly past the forward end of the hopper opening so as to fully close the opening. Optionally, a seal may be placed inside the casing to seal the front end of the tube as it reaches its end of travel. The seal 56 may be located anywhere on the piston wall provided that the seal remains inside the tube 16 at the end of the stroke of the piston.

The casing 10, tube 16 and piston 40 are of circular cross-section.

The above-disclosed pump may also be provided with a non-return valve located in the discharge outlet of the casing.

The above-disclosed pump operates as follows:

Let us assume that the pump is at the end of a compression cycle with the piston 40 in the discharge outlet of the casing. If the pump is provided with a non-return valve, the latter automatically closes at the end of the compression cycle. Then, the piston and the tube are withdrawn by the cylinders 18 and 42, preferably simultaneously, to save operating time. Upon withdrawal of the tube 16, the viscous material in the hopper fills the casing. When both the piston and the tube are back to their fully retracted position, the cylinder 18 is operated in the reverse direction to push the tube forward to trap a certain quantity of viscous material within the tube. When the tube abuts the front end of the casing, the non-return valve opens and the piston 40 pushes the viscous material trapped inside the tube 16. The cycle then starts over again.

Figure 3:
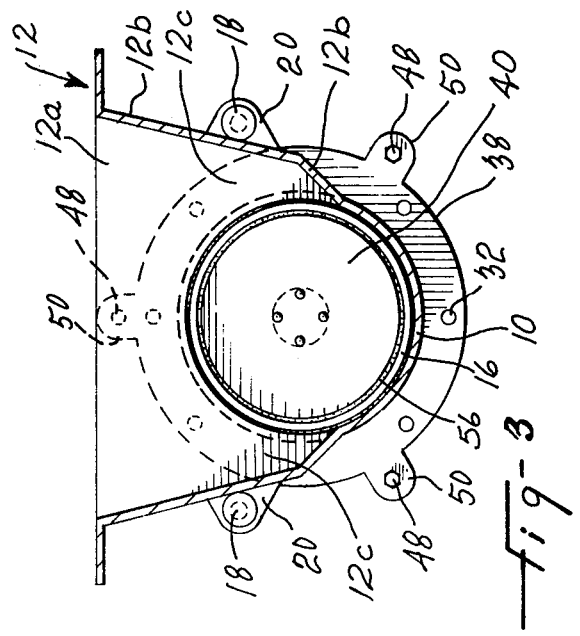
FIG. 3 illustrates a view taken along line 3—3 of FIG. 2.

As shown in FIG. 3, the hopper side walls 12b leave a substantial gap 12c on each side of tube 16 and there is a wide communication between hopper 12 and casing 10. The viscous material can therefore easily flow under gravity into tube 16 and continue to fill gaps 12c, even when tube 16 is in advanced position.

The advancing force exerted by cross-bar 26 is applied to tube 16 above its longitudinal axis.

Although the invention has been disclosed with reference to a preferred embodiment, it is to be understood that it is not limited to such embodiment and that other alternatives are also envisaged.

What I claim is:

1. A pump for pumping viscous mixtures comprising:
   (a) a horizontally-disposed cylindrical casing having a discharge outlet at one end and an elongated feeding opening intermediate the ends of said casing, said feeding opening made in the top and sides of said casing, a hopper for receiving viscous mixtures disposed over and fully communicating with said feeding opening, said hopper having end walls and side walls joining with the edges of said feeding opening, said side walls diverging upwardly from a level below the longitudinal axis of said casing;
   (b) a tube slidably mounted in said casing for movement towards said discharge outlet for trapping a certain quantity of viscous mixtures;
   (c) a piston slidably mounted in said tube for discharging said quantity of viscous mixtures through the discharge outlet of said casing,
   (d) first power means for moving said tube and exerting an advancing force on said tube at a point above the longitudinal axis of said tube; and
   (e) second power means for operating said piston and exerting a force on the latter at a point co-axial with the longitudinal axis of said piston.

2. A pump as defined in claim 1, wherein said first power means includes a pair of horizontally-disposed hydraulic cylinder and piston units carried by said hopper on each side thereof and a cross-bar extending across the rear end of said tube and connected to said hydraulic cylinder and piston units, said cross-bar disposed above the longitudinal axis of said tube.

3. A pump as defined in claim 2, wherein said second power means comprises a cylinder and piston unit mounted co-axial with said piston, attached to said piston at one end, extending past the rear end of said tube and a thrust plate connected to said casing and spaced rearwardly from said rear end of said tube and to which the rear end of said last-named cylinder and piston unit is connected.

4. A pump as defined in claim 1 or 2, further comprising a sealing gasket located between the casing and the sliding tube at the end of said casing opposite to its discharge outlet, and further including a sleeve extending from the back of the piston and of a smaller diameter than said piston, a gasket surrounding said sleeve and abutting against the shoulder formed by said piston and said sleeve, said gasket contacting the inside surface of said tube a flanged sleeve overlying said first-named sleeve and engageable with the opposite side of said gasket and bolts attached to said flanged sleeve and to said piston for tightening said flanged sleeve against said last-named gasket.

* * * * *